LEGEND
——————— INLET MANIFOLD SUCTION.
— — — — — VENTURI SUCTION.
—·—·—·—·— COMBINED SUCTION.

Patented Feb. 16, 1932

1,845,818

UNITED STATES PATENT OFFICE

WILLIAM R. SPILLER, OF CLEVELAND, OHIO, ASSIGNOR TO THE WHITE MOTOR COMPANY, OF CLEVELAND, OHIO, A CORPORATION OF OHIO

SPARK CONTROL

Application filed June 24, 1929. Serial No. 373,115.

This invention relates to means for controlling the firing in the cylinders in internal combustion engines.

Heretofore many methods of controlling the firing or rather the time at which the spark is effected in the cylinders of internal combustion motors have been provided with the intention of improving the performance thereof.

The method most commonly used is to provide a manually controlled handle connected to the timer of the motor, so that the operator can adjust the time and so advance or retard the spark when in his judgment, either would be advantageous. In order to obtain the maximum efficiency to the motor, the operator must be extremely skillful as well as familiar with the motor and must devote considerable attention to the adjustment of the spark control. As a practical matter in the control of internal combustion motors, particularly those used in automotive vehicles, the operator has many other things, such as traffic, to occupy his mind and so does not even make a pretense of always keeping the spark adjusted for maximum efficiency, but leaves it in a position which will keep the motor running without knocking, and the motor therefore operates inefficiently. To remedy this difficulty various attempts to control the spark advance automatically have been made. This may be briefly summarized as follows:

First, regulation has been obtained from engine speed alone. Devices of this type have been operated by many mechanisms such as centrifugal governors, oil and air pressures, etc. This method has been found unsatisfactory, in that, with varying loads, the timing of the spark for maximum efficiency varies even when the motor is operating at constant speed.

Second, regulation has been controlled by suction from the engine manifold. This method is also unsatisfactory as under different loads the speeds at which a given spark advance should be used produce different suctions in the manifold.

Third, regulation has been obtained from a combination of the speed and manifold suction. With a control of this type too great an advance of the spark will be obtained when the motor is operating at high speed with the throttle partly open if the apparatus is set for the correct advance at full throttle.

Fourth, regulation has been also obtained from a combination of the manifold suction and the throttle position. This method is open to some of the objections to control by the manifold suction alone and is moreover limited by mechanical difficulties in properly arranging necessary parts.

Fifth, regulation has been obtained from manifold suction compensated by bleeding. In this method, the suctions obtained are so reduced that sufficient power is not attained to properly actuate the timer adjustment.

Sixth, regulation has also been obtained from compression pressure. This pressure is, of course, mainly dependent upon the position of the throttle and does not properly allow for differences in speed and therefore fails to give a suitable control.

An object of the invention is to provide an improved means for automatically controlling the time of firing charges in internal combustion motors which will cause a motor to which it is applied to operate always at its maximum efficiency regardless of variations in load, speed and other conditions.

Another object is to provide an improved timing means which will obviate the disadvantages of prior devices.

Other objects will hereinafter appear.

I have found that the correct spark advance increases almost directly with the speed at the same load and must be held within a few degrees at open throttle; that the spark must be advanced with decreased load and the smaller the load the greater the range of permissible spark advance; that at higher speeds the increase of spark advance necessary when the load is decreased is not as great as when the load is decreased at lower speeds.

The invention will be better understood from the description of one practical embodiment thereof illustrated in the accompanying drawings, of which:

Figure 1:
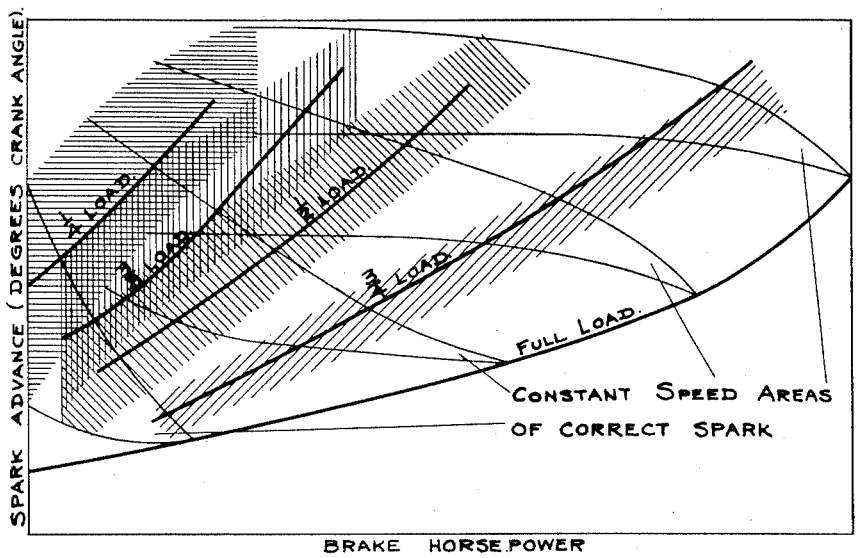
Figure 1 is a diagrammatic representation of the relationship of the spark advance of an internal combustion motor for different speeds and loads, the diagram showing the the horsepower as abscissæ and the degrees of advance as ordinates and showing the curves for full, three-quarters, one-half, three-eighths and one-quarter load.

As will be seen from Figure 1, the spark advance requisite for any given percentage load follows an upwardly sweeping curve as the horsepower (and also the speed) increases, and that this curve is a line at full load but becomes a band of increasing width as the percentage of load decreases, as indicated by the shaded areas. From Figure 2 it will be seen that the suction at the Venturi throat (indicated by the dotted lines) follows a somewhat similar curve, but one which sweeps upward much more rapidly than does the proper spark advance, while the suction in the inlet manifold (indicated by the full lines) follows a series of curves which sweep downwardly instead of upwardly. Obviously, an automatic control depending on either suction alone will not properly advance the spark.

Figure 2:
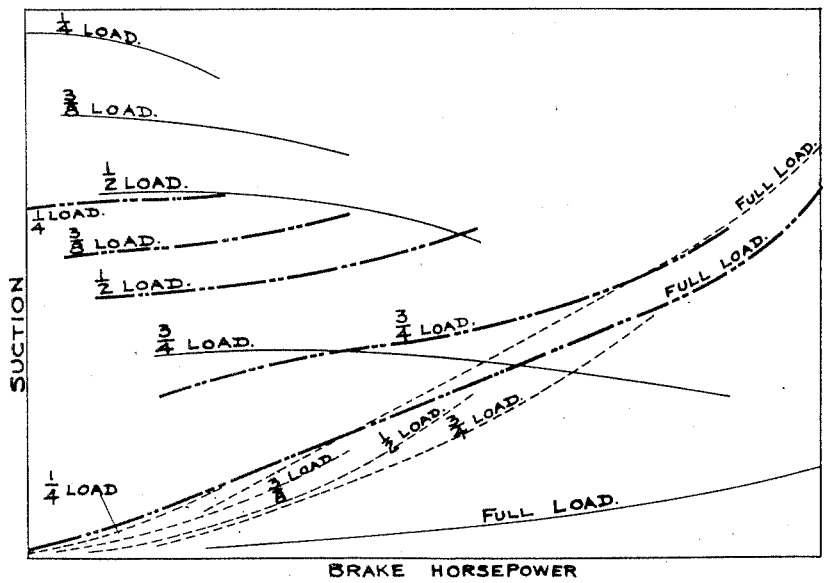
Figure 2 is a similar diagrammatic representation of the variations in suction in the intake manifold and at the Venturi throat, the suctions being plotted against the horsepower as abscissæ and indicated in inches of mercury.

However, by combining the two suctions and so arranging the apparatus that the advance caused by a given change in suction in the inlet manifold is much less, in the case illustrated above, than that caused by an equivalent change in suction at the Venturi throat, a series of curves may be produced which very closely approximate the curves of Figure 1, as shown in the dot and dash lines in Figure 2, the full load curve being substantially identical to that of Figure 1 and the others falling well within the permissible areas.

Figure 3:
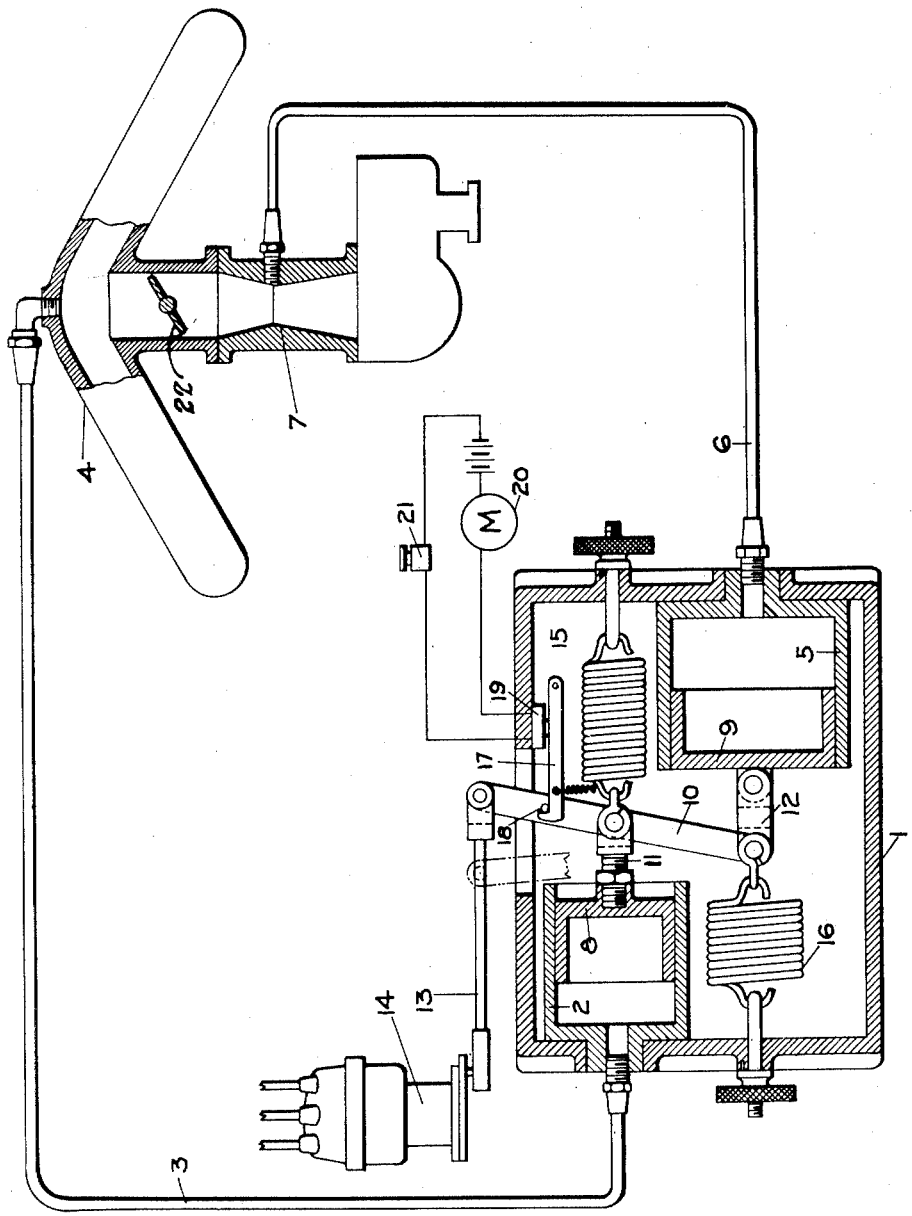
Figure 3 is a sectional, somewhat diagramatic, view of one form of apparatus embodying my invention.

To use these two suctions in the manner just suggested I have devised the apparatus of Figure 3, which consists of two suction operated pistons connected by mechanical linkages to directly actuate the spark advance and to increase the effect of the suction at the Venturi throat relative to the suction in the manifold. The apparatus illustrated comprises a supporting frame 1 on which is carried a cylinder 2 connected by a pipe 3 to the motor's inlet manifold 4, and a cylinder 5 connected by a pipe 6 to the Venturi throat 7, the first mentioned cylinder being of smaller diameter than the second mentioned cylinder. In the cylinders are pistons 8 and 9 connected to a lever 10, this lever being directly pivoted by a bolt 11 to the piston 8 and by a pivoted link 12 to the other piston 9.

The free end of the lever is connected by rod 13 to the timer mechanism 14 so that motion of either piston, caused by an increase in suction, will be utilized to advance the spark. Springs 15 and 16 oppose the motion of the pistons and when the suction in either drops, return them proportionately toward their original positions.

While the suctions used in the illustrated embodiment are those at the Venturi throat and at the inlet manifold, the suctions at any point in the fuel induction system before the throttle valve and at any point after it might be used, the two above referred to being relatively high and therefore providing ample force to operate the spark advance.

In the apparatus illustrated, it has been desired to make the manifold suction about one-fourth as effective as that of the venturi and this is accomplished by use of a piston and cylinder of one-half the cross sectional area, and by connecting the piston so that it has one-half the leverage of that connected to the Venturi throat. Obviously, varying conditions with different motors might require different proportioning and arranging of the parts. At 17 is illustrated a catch which retains the lever in spark retarding position by engaging a pin 18 on the lever, this catch being held in operative position by a magnet 19 connected in the circuit of the starting motor 20, so that when the starting switch 21 is closed upon starting, the suctions cannot advance the spark. Obviously the lever might be held directly by magnetic or any other means and the same result accomplished. The motor throttle is shown at 22.

While I have described the illustrated embodiment of my invention in some particularity, it is obvious that sylphons, diaphragms, or other pressure actuated devices might be substituted for the cylinders shown, and that many other variations and embodiments of the invention may readily be made. I do not therefore confine myself to the precise details illustrated but claim as my invention all embodiments coming within the scope of the subjoined claims.

I claim:

1. In combination with an internal combustion motor having a Venturi throat through which fuel is supplied, spark advancing mechanism comprising means actuated by the suction in the intake manifold and means actuated by the suction at the Venturi throat.

2. The method of controlling the firing of an internal combustion motor having a Venturi throat through which fuel is supplied which comprises advancing the spark in accordance with increases in the suction in the intake manifold and the Venturi throat.

3. The method of controlling the firing in an internal combustion motor having a Venturi throat through which fuel is supplied which comprises advancing the spark in one proportion with the increase in suction in the intake manifold, and in another proportion with the increase in suction at the Venturi throat.

4. Ignition controlling apparatus for an internal combustion motor having a Venturi throat through which fuel is supplied comprising two expansive chambers, one of which is connected to the intake manifold of the motor and the other of which is connected to the Venturi throat thereof, a mechanical linkage adding the motions imparted by suction in said chambers and connected to adjust the timing mechanism of the motor.

5. Ignition controlling apparatus for an internal combustion motor having a Venturi throat through which fuel is supplied comprising two expansive chambers, one of which is connected to the intake manifold of the motor and the other of which is connected to the Venturi throat thereof, a mechanical linkage adding the motions imparted by suction in said chambers connected to adjust the timing mechanism, and springs for returning said linkage as the suction in said chambers decreases.

6. Firing controlling mechanism for an internal combustion motor having a Venturi throat through which fuel is supplied which comprises a lever connected at one end to the timing mechanism, two expansive chambers connected to the lever at spaced points, one of the chambers being in communication with the inlet manifold of the motor, and the other being in communication with the Venturi throat thereof.

7. Spark controlling mechanism for an internal combustion motor having a Venturi throat through which fuel is supplied comprising two cylinders, one of which is in communication with the inlet manifold of the motor and the other of which is in communication with the Venturi throat thereof, a piston in each of said cylinders, a lever pivotally connected to one of said pistons, a link pivotally connected to said lever and to the other of said pistons, the lever being connected to the timing mechanism of the motor.

8. Spark controlling mechanism for an internal combustion motor having a Venturi throat through which fuel is supplied comprising two cylinders, one of which is in communication with the inlet manifold of the motor and the other of which is in communication with the Venturi throat thereof, a piston in each of said cylinders, a lever pivotally connected to one of said pistons, a link pivotally connected to said lever and to the other of said pistons, the lever being connected to the timing mechanism of the motor, and a catch arranged to maintain the lever in spark-retarding position and held in operative position by the starting of the motor.

9. Spark controlling mechanism for an internal combustion motor having a Venturi throat through which fuel is supplied comprising two cylinders, one of which is in communication with the inlet manifold of the motor and the other of which is in communication with the Venturi throat thereof, a piston in each of said cylinders, a lever pivotally connected to one of said pistons, a link pivotally connected to said lever and to the other of said pistons, springs opposing the motion of the pistons caused by suction in the cylinders, the lever being connected to adjust the timing mechanism of the motor, and a catch arranged to maintain the lever in spark-retarding position and rendered operative by the supply of electricity to the starter of the motor.

10. The method of controlling the firing in an internal combustion motor which comprises controlling the timing of the spark in one proportion with changes in suction before the throttle and in another proportion with changes in suction after the throttle.

11. Firing controlling mechanism for internal combustion motors which comprises a lever connected at one end to the timing mechanism, two expansive chambers connected to the lever at spaced points, one of the chambers being in communication with the fuel induction system between the throttle and inlet valves of the motor, and the other being in communication with the fuel induction system on the opposite side of the throttle.

12. Spark controlling mechanism for an internal combustion motor comprising two cylinders, one of which is in communication with the fuel induction system between the throttle and the inlet valves of the motor and the other of which is in communication with the fuel induction system on the opposite side of the throttle, a piston in each of said cylinders, a lever pivotally connected to one of said pistons, a link pivotally connected to said lever and to the other of said pistons, the lever being connected to the timing mechanism of the motor.

13. In combination with an internal combustion motor having a fuel mixture intake of varying cross-section, a spark advancing mechanism comprising means actuated by two suctions in said intake at points of different cross-sectional area.

14. The method of controlling the firing of an internal combustion motor which has a fuel mixture intake of varying cross-section which comprises advancing the spark in accordance with increases in the suction at two points in said intake of different cross-sectional area.

15. In combination with an internal combustion motor having an intake conduit connecting the cylinders of the motor with the carburetor, a spark advancing mechanism comprising means actuated by two suctions in the intake conduit between the carburetor and the motor, one before and one after the throttle valve.

16. In combination with an internal combustion motor having an intake conduit connecting the cylinders of the motor with the carburetor, a spark advancing mechanism comprising a means actuated by two suctions in the intake conduit between the carburetor and the motor, the suctions being taken at parts of the intake conduit of different cross-sectional areas.

In testimony whereof I hereunto affix my signature this 18th day of June, 1929.

WILLIAM R. SPILLER.